United States Patent
Takizawa (10) Patent No.: US 8,344,677 B2
(45) Date of Patent: Jan. 1, 2013

(54) POWER CONVERSION EQUIPMENT

(75) Inventor: Satoki Takizawa, Hino (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 360 days.

(21) Appl. No.: 12/843,970

(22) Filed: Jul. 27, 2010

(65) Prior Publication Data

US 2011/0025236 A1  Feb. 3, 2011

(30) Foreign Application Priority Data

Jul. 31, 2009 (JP) .................. 2009-179378

(51) Int. Cl.
*H02P 27/00* (2006.01)

(52) U.S. Cl. ........ 318/500; 318/139; 318/140; 318/377; 318/378; 318/440; 180/65.1; 180/65.21; 180/65.22; 180/65.225; 180/65.29; 180/65.31

(58) Field of Classification Search .......... 318/139, 318/376, 377, 148; 180/65.1, 65.21, 65.22, 180/65.24, 65.225, 65.29, 65.31; 361/31
See application file for complete search history.

(56) References Cited

U.S. PATENT DOCUMENTS

| | | | | |
|---|---|---|---|---|
| 5,589,743 A | * | 12/1996 | King | 318/139 |
| 6,215,198 B1 | * | 4/2001 | Inada et al. | 290/40 C |
| 6,688,125 B2 | * | 2/2004 | Okamoto et al. | 62/239 |
| 6,848,407 B2 | * | 2/2005 | Kobayashi et al. | 123/182.1 |
| 6,943,531 B2 | * | 9/2005 | Fukaya | 322/10 |
| 7,279,855 B2 | * | 10/2007 | Tahara et al. | 318/46 |
| 7,940,018 B2 | * | 5/2011 | Yonemori et al. | 318/376 |
| 8,008,876 B2 | * | 8/2011 | Yonemori et al. | 318/151 |
| 8,008,888 B2 | * | 8/2011 | Oyobe et al. | 320/108 |
| 8,198,836 B2 | * | 6/2012 | Kachi et al. | 318/139 |
| 2011/0121779 A1 | * | 5/2011 | Ichikawa et al. | 320/109 |
| 2012/0013182 A1 | * | 1/2012 | Minegishi et al. | 307/9.1 |

FOREIGN PATENT DOCUMENTS

JP   2007-089262 A   4/2007

* cited by examiner

*Primary Examiner* — Rita Leykin
(74) *Attorney, Agent, or Firm* — Rabin & Berdo, P.C.

(57) ABSTRACT

Power conversion equipment includes an electric power converting section that converts DC electric power to multiphase AC electric power and feeds the converted multiphase AC electric power to a multiphase AC motor. A first short-circuit section includes a first switch disposed between a first DC power supply and the electric power converting section. A second short-circuit section includes a second switch disposed between at least one of an electric power feeding section and the electric power input section in the first DC power supply, or between a multiphase AC output point of the electric power converting section and the multiphase AC motor. A switch control section controls the first switch and the second switch such that the first and second switches are prevented from being brought into the closed-state simultaneously.

12 Claims, 10 Drawing Sheets

POWER CONVERSION EQUIPMENT

CROSS-REFERENCE TO RELATED APPLICATION

This application claims priority under 35 U.S.C. §119 from Japanese Patent Application 2009-179378, filed Jul. 31, 2009, the entirety of which is incorporated herein by reference.

FIELD OF THE INVENTION

The present invention relates to power conversion equipment applicable to a motor driving apparatus that drives a motor with the electric power fed at least from a battery in hybrid vehicles and electric vehicles.

BACKGROUND

Japanese Unexamined Patent Application Publication No. 2007-89262 discloses power conversion equipment used typically in hybrid vehicles. The disclosed power conversion equipment includes a first DC power supply, a driving circuit, an electric power converter, a second DC power supply, and a control means.

The first DC power supply includes a battery, for example. The driving circuit includes an inverter, fed with a DC voltage, that conducts electric power conversions for controlling the motor drive for driving the vehicle. The electric power converter is connected between the first DC power supply and the driving circuit and formed of a boost converter that conducts a DC voltage conversion between the first DC power supply and the driving circuit. The second DC power supply includes capacitor C0 connected in parallel to the electric power converter via a switching means. The control means sets the reference value of the output voltage that the electric power converter feeds to the connection point of the driving circuit and the second DC power supply and controls the operations of the electric power converter to make the output voltage and the set reference value thereof coincide with each other.

The control means includes a first reference value setting means that sets the voltage corresponding to the required output of a motor as a reference voltage, a second reference value setting means that sets a voltage higher than the voltage corresponding to the required output and capable of charging the second DC power supply as the reference voltage, and a selecting means that selects any of the first reference value setting means and the second reference value setting means in response to the request of the driver of the vehicle.

The relations between the motor torque Tm, the output voltage V of the inverter that configures the driving circuit, the motor current Im, and the number of motor revolutions (hereinafter referred to as the "motor speed") Nm in the conventional power conversion equipment disclosed in Japanese Unexamined Patent Application Publication No. 2007-89262 are described in FIG. 10.

Figure 10:
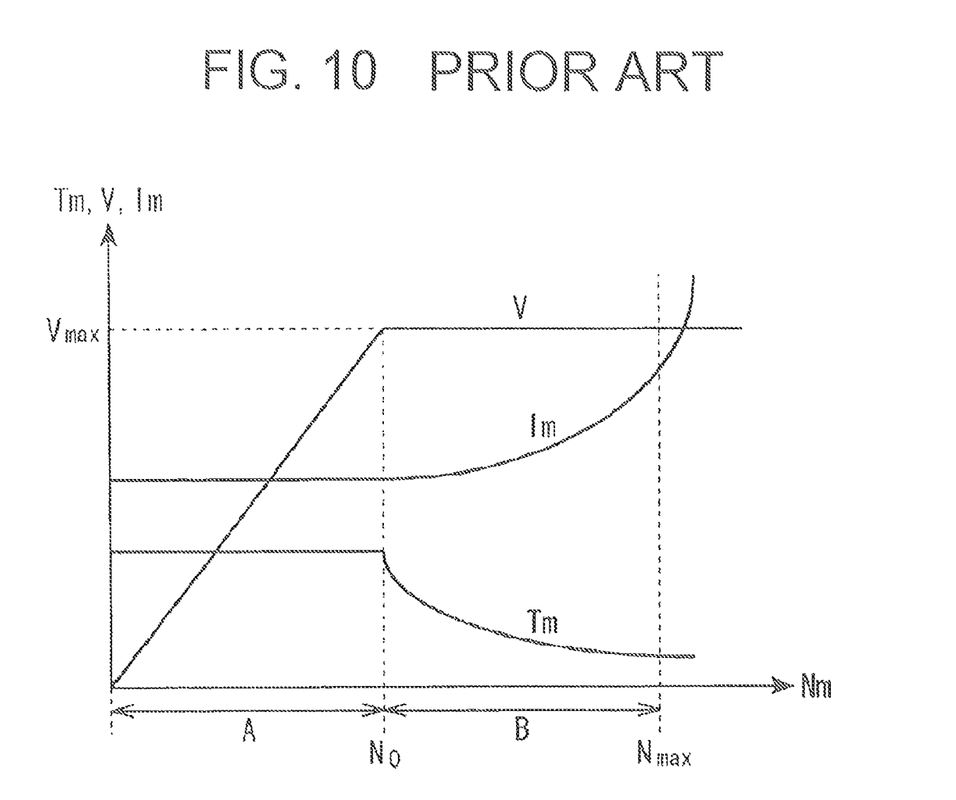
FIG. 10 is a set of curves describing the motor driving performances of the conventional power conversion equipment.

As described in FIG. 10, the motor torque Tm and the motor current Im are set to be almost constant by the V/F control in the range, in which the motor speed Nm changes from 0 to the predetermined revolution number $N_0$, and the output voltage V of the inverter increases in response to the increase of the motor speed Nm. Since the voltage that the inverter can feed is limited to the maximum voltage Vmax, it is necessary to conduct a flux-weakening control of the motor for further increasing the revolution speed of the motor, as the motor speed Nm exceeds the predetermined revolution number $N_0$ to the larger side. If the flux-weakening control is conducted, the value Im of the motor current that flows through the motor will also increase, as described in FIG. 10, in association with the increase of the reactive power component.

If one wants to drive the motor at a higher speed using an inverter but not conducting any flux-weakening control, it will be necessary to increase the converter capacity of the inverter. In other words, a tradeoff relation exists between the converter capacity of an inverter and the maximum revolution speed of a motor. If one wants to construct a system that facilitates driving a motor at a higher speed without conducting any flux-weakening control, the manufacturing costs of the electric power converter including the costs of increasing the converter capacity will soar.

The charging capacity of a capacitor is expressed by the following formula in the case in which the capacitor constituting the second DC power supply is charged by the battery voltage boosted by a boost converter.

The charging capacity of the capacitor=the charging current×the charging time

In other words, the charging current (the converter capacity of the boost converter) and the charging time are inversely proportional to each other. If one wants to shorten the charging time, it will be necessary to increase the charging current. If the charging current is increased, the converter capacity of the boost converter should be large and the costs for increasing the converter capacity will soar.

In view of the foregoing, it would be desirable to obviate the problems described above. It would be also desirable to provide power conversion equipment that facilitates driving a motor at a high revolution speed and/or charging a DC power supply at a high speed with low costs.

SUMMARY OF THE INVENTION

According to the invention, there is provided power conversion equipment including a first DC power supply, the first DC power supply including an electric power feeding section. The power conversion equipment further includes an electric power input section, to which electric power is fed from the electric power feeding section, and a DC electric power converting section converting the electric power fed to the electric power input section to DC electric power. The power conversion equipment further includes a second DC power supply including a capacitor connected in parallel to the first DC power supply, and a smoothing circuit section smoothing the DC electric power fed from the first DC power supply and the DC electric power fed from the second DC power supply.

The power conversion equipment further includes an electric power converting section connected to the smoothing circuit section, the electric power converting section converting the DC electric power to multiphase AC electric power, and the electric power converting section feeding the converted multiphase AC electric power to a multiphase AC motor. The power conversion equipment further includes a first short-circuit section including a first switch inserted therein, the first switch being disposed between the multiphase AC output point of the electric power input section in the first DC power supply and the multiphase AC output point of the electric power converting section.

The power conversion equipment further includes a second short-circuit section including a second switch inserted therein, the second switch being disposed at least between the electric power feeding section and the electric power input section in the first DC power supply or between the multiphase AC output point of the electric power converting section and the multiphase AC motor, and a switch control section that controls the first switch and the second switch such that the first switch and the second switch are prevented from being brought into the closed-state simultaneously.

Advantageously, the electric power feeding section in the first DC power supply includes or forms a multiphase AC generator, and the DC electric power converting section in the first DC power supply includes or forms a multiphase AC-DC converter circuit.

Advantageously, the multiphase AC generator is driven by an internal combustion engine.

Advantageously, the electric power feeding section in the first DC power supply includes or forms a battery and the DC electric power converting section in the first DC power supply includes or forms a boost circuit.

Advantageously, the DC electric power converting section in the first DC power supply includes a switching arm including a switching device and a diode connected in opposite parallel to each other.

Advantageously, the electric power converting section includes a switching arm including a switching device and a diode connected in opposite parallel to each other.

Put in other terms, embodiments of the invention relate to power conversion equipment that can comprise at least one DC power supply including an electric power feeding section and an electric power input section, and an electric power converting section connected to the at least one DC power supply, for converting DC electric power output by the at least one DC power supply to multiphase AC electric power. A first switch can be disposed between a multiphase AC output point of the at least one DC power supply and a multiphase AC output point of the electric power converting section, and a second switch can be disposed between the electric power feeding section and the electric power input section in the at least one DC power supply. A switch control section can be provided, for controlling the first switch and the second switch, to prevent the first switch and the second switch from being closed simultaneously.

In alternative embodiments, the second switch can be disposed between the multiphase AC output point of the electric power converting section and a multiphase AC motor.

The power conversion equipment can further comprise a smoothing circuit section for smoothing DC electric power output from the at least one DC power supply, and can still further comprise another DC power supply connected to the smoothing circuit section and the at least one DC power supply.

The power conversion equipment according to the invention at least drives the motor or charges the second DC power supply employing both the DC electric power converting section of the first DC power supply and the electric power converting section. Therefore, the power conversion equipment according to the invention facilitates at least driving the motor at a high speed or charging the second DC power supply at a high speed.

DETAILED DESCRIPTION OF THE INVENTION

The invention will be described in detail hereinafter with reference to the accompanying drawings.

Figure 1:
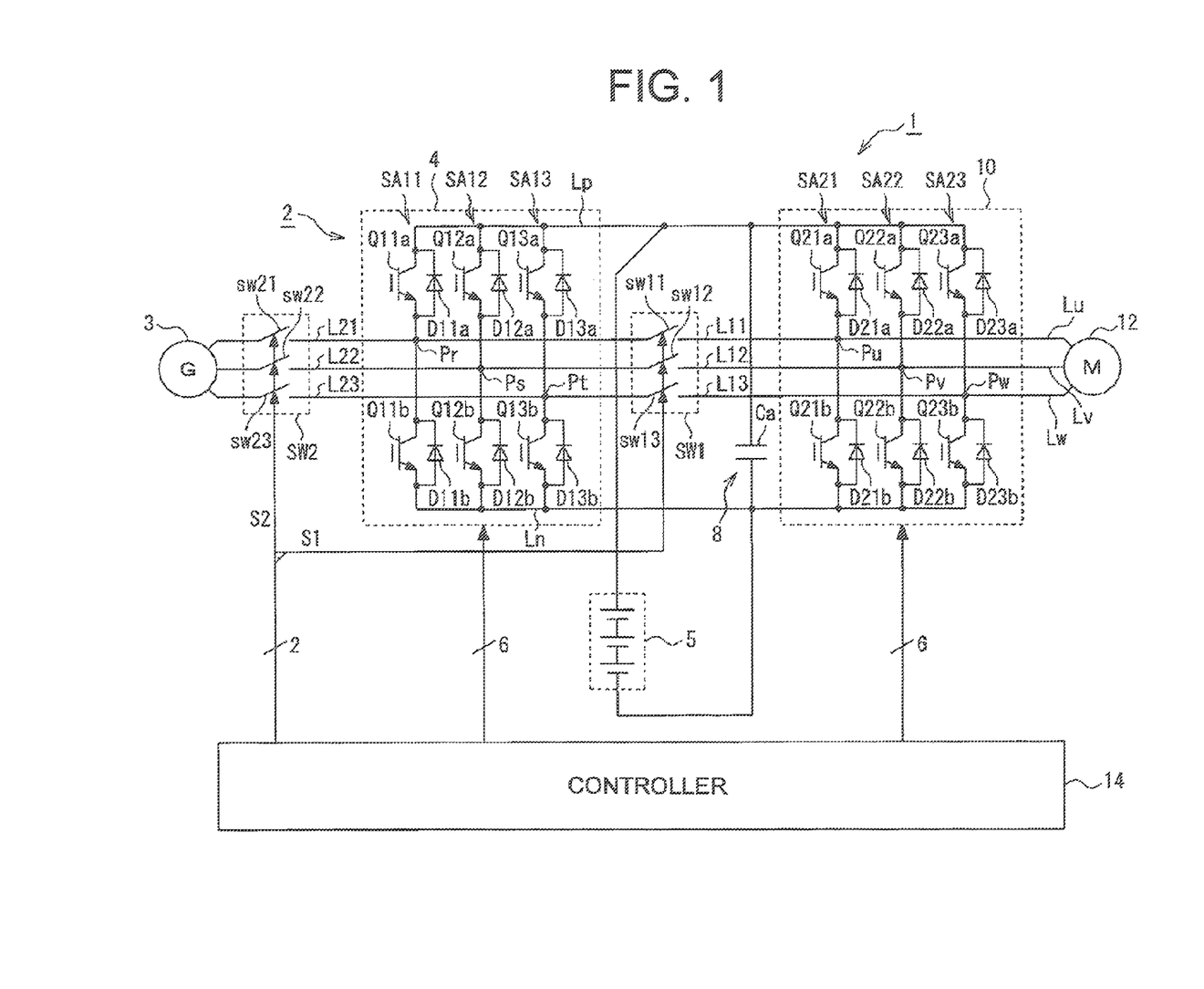
FIG. 1 is a block diagram of power conversion equipment according to a first embodiment of the invention.

FIG. 1 is a block diagram of power conversion equipment according to a first embodiment of the invention.

In FIG. 1, power conversion equipment 1 is applied to a motor driving apparatus. Power conversion equipment 1 includes first DC power supply 2 that feeds DC electric power by power generation. The first DC power supply 2 includes three-phase AC generator 3 as an electric power feeding section connected to the output shaft of a rotating drive source including or formed by a gasoline engine or a like internal combustion engine. First DC power supply 2 also includes an AC-DC converter circuit 4 as a DC voltage converting section that converts the three-phase AC electric power fed from three-phase AC generator 3 to DC electric power.

AC-DC converter circuit 4 includes three switching arms SA11, SA12, and SA13 connected in parallel between positive-polarity-side line (hereinafter referred to simply as "positive line") Lp and negative-polarity-side line (hereinafter referred to simply as "negative line") Ln. Each of switching arms SA11, SA12, and SA13 includes switching devices Qia and Qib (i=11, 12 and 13) formed of insulated gate bipolar transistors (hereinafter referred to as "IGBTs") connected in series to each other between positive line Lp and negative line Ln. Each of switching arms SA11, SA12, and SA13 also includes diodes Dia and Dib connected in opposite parallel to switching devices Qia and Qib. Three-phase electric power is fed from three-phase AC generator 3 to connection points Pr, Ps, and Pt working for electric power input sections for switching devices Q11a and Q11b, switching devices Q12a and Q12b, and switching devices Q13a and Q13b via second short-circuit paths L21, L22, and L23 including second switch SW2 inserted therein.

Figures 3A, 3B:
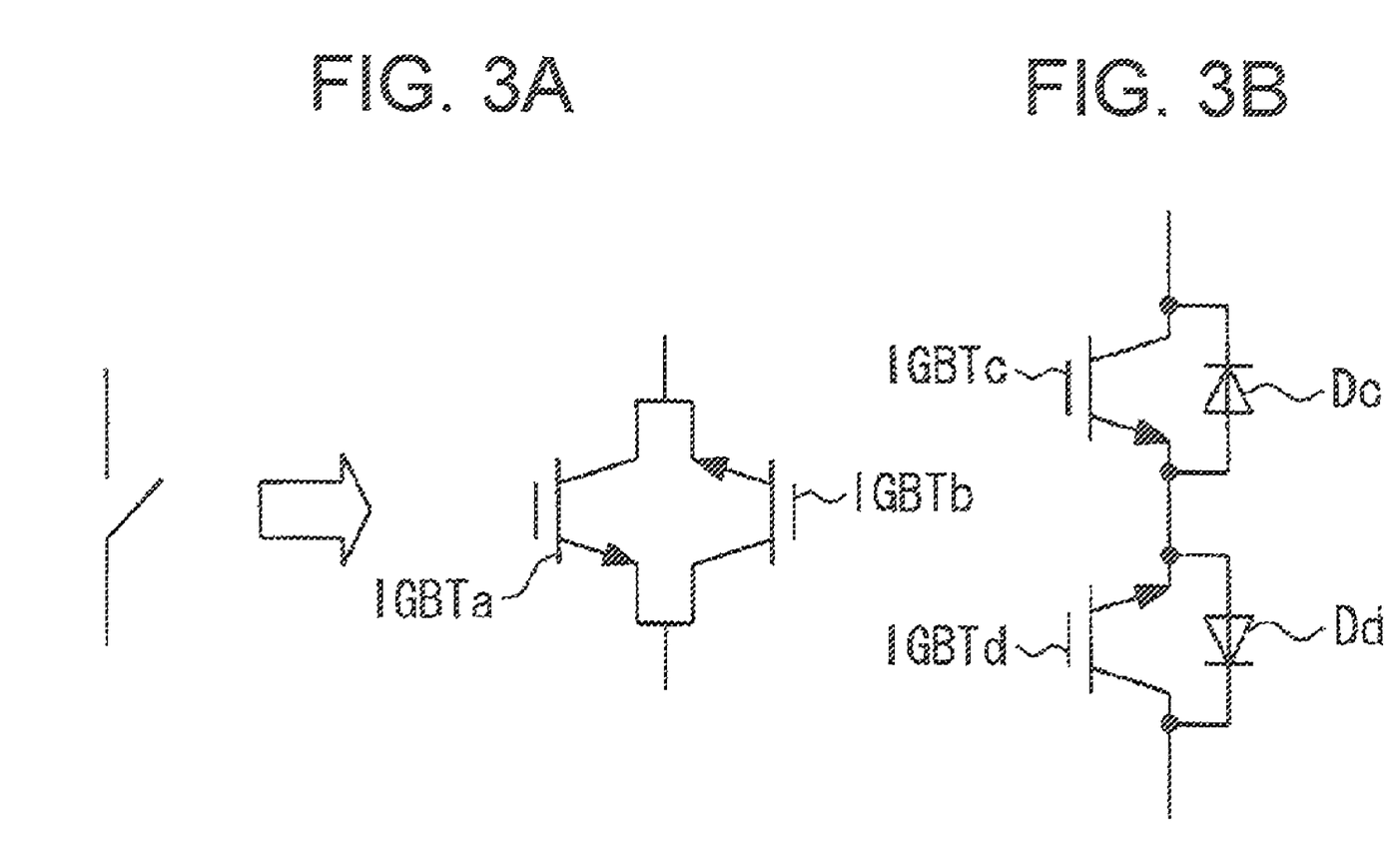
FIG. 3A is a circuit diagram of a bidirectional switch including IGBTs exhibiting a reverse blocking voltage and connected in opposite parallel to each other.
FIG. 3B is a circuit diagram of a bidirectional switch including IGBTs not exhibiting any reverse blocking voltage but connected in series to each other, and diodes connected in opposite parallel to the IGBTs.

Second switch SW2 includes switches sw21, sw22, and sw23 inserted in short-circuit paths L21, L22, and L23, respectively. A relay or a like mechanical switch, or a bidirectional semiconductor switch is applicable to switches sw21, sw22, and sw23. For a bidirectional semiconductor switch, IGBT a and IGBT b, both exhibiting a reverse blocking voltage and connected in opposite parallel as shown in FIG. 3A are preferably applicable. Alternatively, IGBT c and IGBT d, not exhibiting any reverse blocking voltage but connected in series to each other, and diodes Dc and Dd connected in opposite parallel to IGBT c and IGBT d, respectively, as shown in FIG. 3B, are preferably applicable to a bidirectional semiconductor switch.

Power conversion equipment 1 includes second DC power supply 5 connected in parallel to first DC power supply 2 and between positive line Lp and negative line Ln of first DC power supply 2. Second DC power supply 5 includes a battery of several hundreds of volts (V) formed of many battery units of several volts (V) connected in series to each other.

Further, smoothing circuit 8 is connected between positive line Lp and negative line Ln and in parallel to first and second DC power supplies 2 and 5. Smoothing circuit 8 includes smoothing capacitor Ca connected in series between positive line Lp and negative line Ln.

DC-AC converter circuit 10, constituting an inverter circuit working as the electric power converting section that converts the DC electric power of smoothing circuit 8 to AC electric power, is connected between positive line Lp and negative line Ln. DC-AC converter circuit 10 includes three switching arms SA21, SA22, and SA23 connected in parallel between positive line Lp and negative line Ln. Each of switching arms SA21, SA22, and SA23 includes switching devices Qja and Qjb (j=21, 22 and 23) formed of IGBTs connected in series to each other between positive line Lp and negative line Ln. Each of switching arms SA21, SA22, and SA23 includes also diodes Dja and Djb connected in opposite parallel to switching devices Qja and Qjb.

The connection points of switching devices Qja and Qjb are designated as AC outputs points Pu, Pv, and Pw and connected to three-phase AC motor 12 as a load. AC outputs points Pu, Pv and Pw are connected to input points Pr, Ps, and Pt of AC-DC converter circuit 4 in first DC power supply 2 via short-circuit paths L11, L12, and L13, into which first switch SW1 is inserted, respectively. First switch SW1 has a structure similar to the structure of second switch SW2 described earlier.

Controller 14 conducts the PWM control of the switching devices in AC-DC converter circuit 4 of first DC power supply 2 and the switching devices in DC-AC converter circuit 10 as shown in FIG. 1. Controller 14 also conducts the ON-OFF control of first switch SW1 and second switch SW2 such that either first switch SW1 or second switch SW2 is open, when either second switch SW2 or first switch SW1 is closed.

Figure 2:
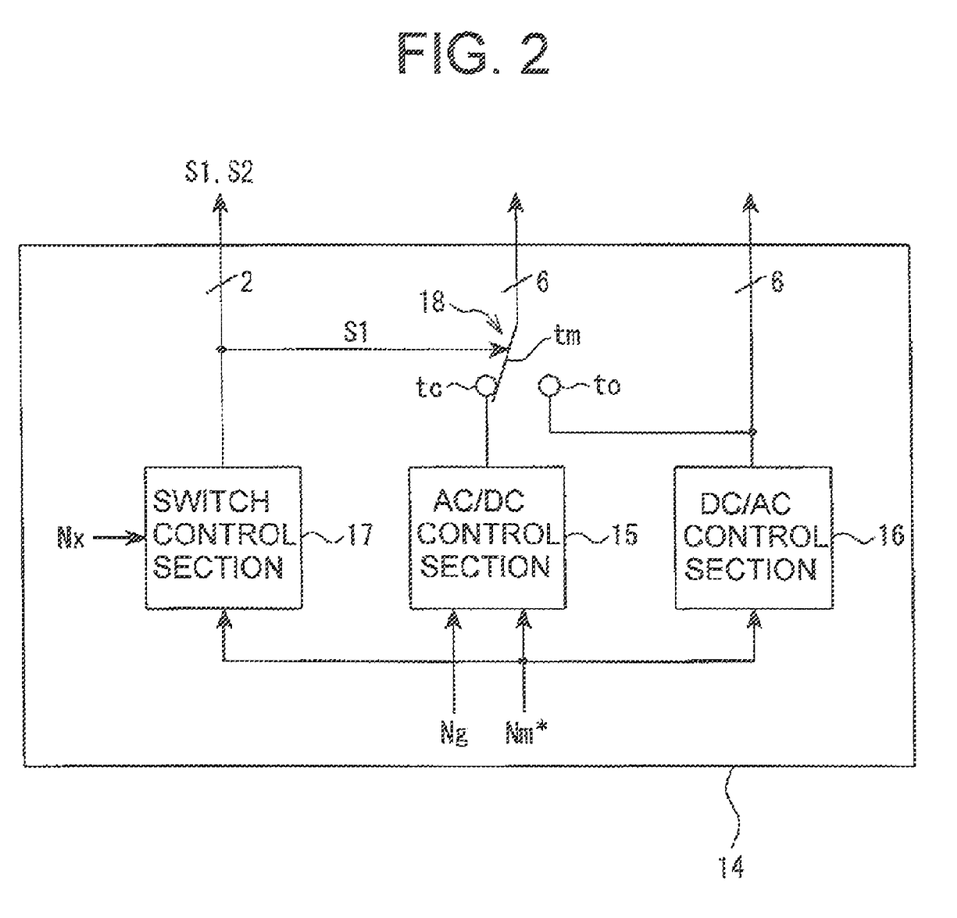
FIG. 2 is a block diagram showing the structure of the controller in FIG. 1.

FIG. 2 is a block diagram showing the structure of controller 14.

As shown in FIG. 2, controller 14 includes AC-DC control section 15 that controls the drive of AC-DC converter circuit 4, DC-AC control section 16 that controls the drive of DC-AC converter circuit 10, and switch control section 17 that controls the ON and OFF of first switch SW1 and second switch SW2.

The detected speed Ng and the command value of the speed or the frequency (hereinafter referred to as the "speed command value or the frequency command value") Nm* of three-phase AC generator 3 are fed to AC-DC control section 15. AC-DC control section 15 generates the PWM signals fed to the gates of switching devices in AC-DC converter circuit 4 based on the detected speed Ng and the speed command value (or the frequency command value) Nm*.

The speed command value (or the frequency command value) Nm* of three-phase AC motor 12 is fed to DC-AC control section 16. DC-AC control section 16 generates the PWM signals fed to the gates of switching devices in DC-AC converter circuit 10 based on the speed command value (or the frequency command value) Nm*.

The speed command value (or the frequency command value) Nm* of three-phase AC motor 12 and the set number of revolutions (hereinafter referred to as the "set revolution number) Nx corresponding to the predetermined number of revolutions (hereinafter referred to as the "predetermined revolution number) $N_0$ are fed to switch control section 17. In the state in which the motor speed corresponding to the speed command value (or the frequency command value) Nm* is smaller than the set revolution number Nx, switch control section 17 feeds a switching signal S1 in the OFF-state that brings switches sw11, sw12, and sw13 in first switch SW1 into the open state thereof, and a switching signal S2 in the ON-state that brings switches sw21, sw22, and sw23 in second switch SW2 into the closed state thereof.

In the state in which the motor speed corresponding to the speed command value (or the frequency command value) Nm* is equal to or larger than the set revolution number Nx, switch control section 17 feeds the switching signal S1 in the ON-state that brings switches sw11, sw12, and sw13 in first switch SW1 into the closed state thereof, and the switching signal S2 in the OFF-state that brings switches sw21, sw22, and sw23 in second switch SW2 into the open state thereof.

Selecting switch section 18 is disposed on the output side of AC-DC control section 15. Selecting switch section 18 includes normally-closed contact tc, normally-open contact to, and moveable contact tm that is selectably in contact with normally-closed contact tc or normally-open contact to. Moveable contact tm is in contact with normally-closed contact tc in the state in which the switching signal S1 of switch control section 17 is in the OFF-state thereof, and in contact with normally-open contact to in the state in which the switching signal S1 is in the ON-state thereof.

The operations of the power conversion equipment according to the first embodiment will be described below.

For driving three-phase AC motor 12 below the set revolution number Nx in the state in which three-phase motor 12 is rotated, the speed command value (or frequency command value) Nm* indicating the motor speed smaller than the set revolution number Nx is fed to controller 14 from a motor speed controller not shown.

Therefore, switch control section 17 brings the switching signal S1 for first switch SW1 into the OFF-state and the switching signal S2 for second switch SW2 into the ON-state. Therefore, switches sw11, sw12, and sw13 in first switch SW1 are brought into the open state and switches sw21, sw22, and sw23 in second switch SW2 into the closed state. At the same time, moveable contact tm in selecting switch section 18 is brought into contact with normally-closed contact tc and the PWM signals outputted from AC-DC control section 15 are fed to AC-DC converter circuit 4.

In AC-DC control section 15, PWM signals are generated based on the detected speed Ng and the speed command value (or the frequency command value) Nm* of three-phase AC generator 3 fed thereto. The generated PWM signals are fed to AC-DC converter circuit 4. As the PWM signals are fed, AC-DC converter circuit 4 converts the three-phase AC output fed from three-phase AC generator 3 via second switch SW2 to DC electric power. The DC electric power fed from AC-DC converter circuit 4 is smoothed by smoothing capacitor Ca in smoothing circuit 8 and fed to DC-AC converter circuit 10. In the state in which the charged amount of second DC power supply 5 is lower than a predetermined value, the DC electric power fed from AC-DC converter circuit 4 charges second DC power supply 5.

DC-AC control section 16 generates the PWM signals for the gates of the switching devices in DC-AC converter circuit 10 based on the speed command value (or the frequency command value) Nm* and feeds the generated PWM signals to the gates of the switching devices in DC-AC converter circuit 10. Based on the PWM signals fed, DC-AC converter circuit 10 converts DC electric power to three-phase AC electric power and feeds the three-phase AC electric power to windings Lu, Lv, and Lw of three-phase AC motor 12 from AC output points Pu, Pv, and Pw, and three-phase AC motor 12 is rotated.

As the speed command value (or the frequency command value) Nm* for diving three-phase AC motor 12 at a motor speed larger than the set revolution number Nx is fed to controller 14 in the state in which three-phase AC motor 12 is rotated, switch control section 17 reverses the switching signal S1 to the ON-state thereof and the switching signal S2 to the OFF-state thereof. Therefore, first switch SW1 is brought into the closed state thereof and input points Pr, Ps, and Pt of AC-DC converter circuit 4 are connected to AC output points Pu, Pv, and Pw of DC-AC converter circuit 10 via short-circuit paths L11, L12, and L13. On the other hand, second switch SW2 is brought into the open state thereof and the feed of the electric power generated in three-phase generator 3 to AC-DC converter circuit 4 is interrupted.

As the switching signal S1 of switch control section 17 in controller 14 is brought into the ON-state thereof, moveable contact tm in selecting switch section 18 is changed over to the side of normally-open contact to and the PWM signals generated in DC-AC control section 16 are fed to AC-DC converter circuit 4 in addition to DC-AC converter circuit 10.

Therefore, the DC electric power from second DC power supply 5 is converted to three-phase AC electric power in DC-AC converter circuit 10 as usual and fed to AC output points Pu, Pv, and Pw. In addition, the DC electric power from second DC power supply 5 is also converted to three-phase AC electric power in AC-DC converter circuit 4 and fed to input points Pr, Ps, and Pt. The three-phase electric power fed to input points Pr, Ps, and Pt is fed to AC output points Pu, Pv, and Pw of DC-AC converter circuit 10 via first switch SW1 and short-circuit paths L11, L12, and L13.

Therefore, it is possible to obtain, from AC output points Pu, Pv, and Pw, a three-phase AC current twice as high as the three-phase AC current for driving three-phase motor 12 at a motor speed smaller than the set revolution number Nx. By feeding the high three-phase AC current to windings Lu, Lv, and Lw of three-phase motor 12, it is possible to rotate three-phase motor 12 at a high speed.

As described above, in the case in which three-phase AC motor 12 is rotated as usual at a motor speed smaller than the set revolution number Nx, the DC electric power is converted to AC electric power only by DC-AC converter circuit 10. In the case in which three-phase AC motor 12 is rotated at a motor speed equal to or larger than the set revolution number Nx, AC-DC converter circuit 4 is used also for a DC-AC converter circuit, and the DC electric power is converted to AC electric power by two DC-AC converter circuits. Therefore, it is possible to increase the maximum value of the current fed to three-phase AC motor 12 and to rotate three-phase AC motor 12 at a high speed without conducting any flux-weakening control.

Moreover, it is possible to rotate three-phase AC motor 12 at a high speed by a very simple structure, which includes short-circuit paths L11, L12, and L13 including first switch SW1, short-circuit paths L21, L22, and L23 including second switch SW2 and controller 14 including switch control section 17 and selecting switch section 18. Therefore, it is possible to obtain the very simple structure with cheaper manufacturing costs as compared with the increase of the converter capacity of the switching devices in DC-AC converter circuit 10.

Although the power conversion equipment according to the first embodiment has been described so far in connection with the increase of the maximum current value that power conversion equipment 1 is capable of feeding, changes and modifications are possible. For example, in the case in which the maximum value of the current that power conversion equipment 1 is capable of feeding is as high as that of the conventional power conversion equipment, it is possible to lower the converter capacity of DC-AC converter circuit 10.

Next, power conversion equipment according to a second embodiment of the invention will be described below, with reference to FIGS. 4 and 5.

The power conversion equipment according to the second embodiment is configured such that second DC power supply 5 is charged at a high speed.

Figure 4:
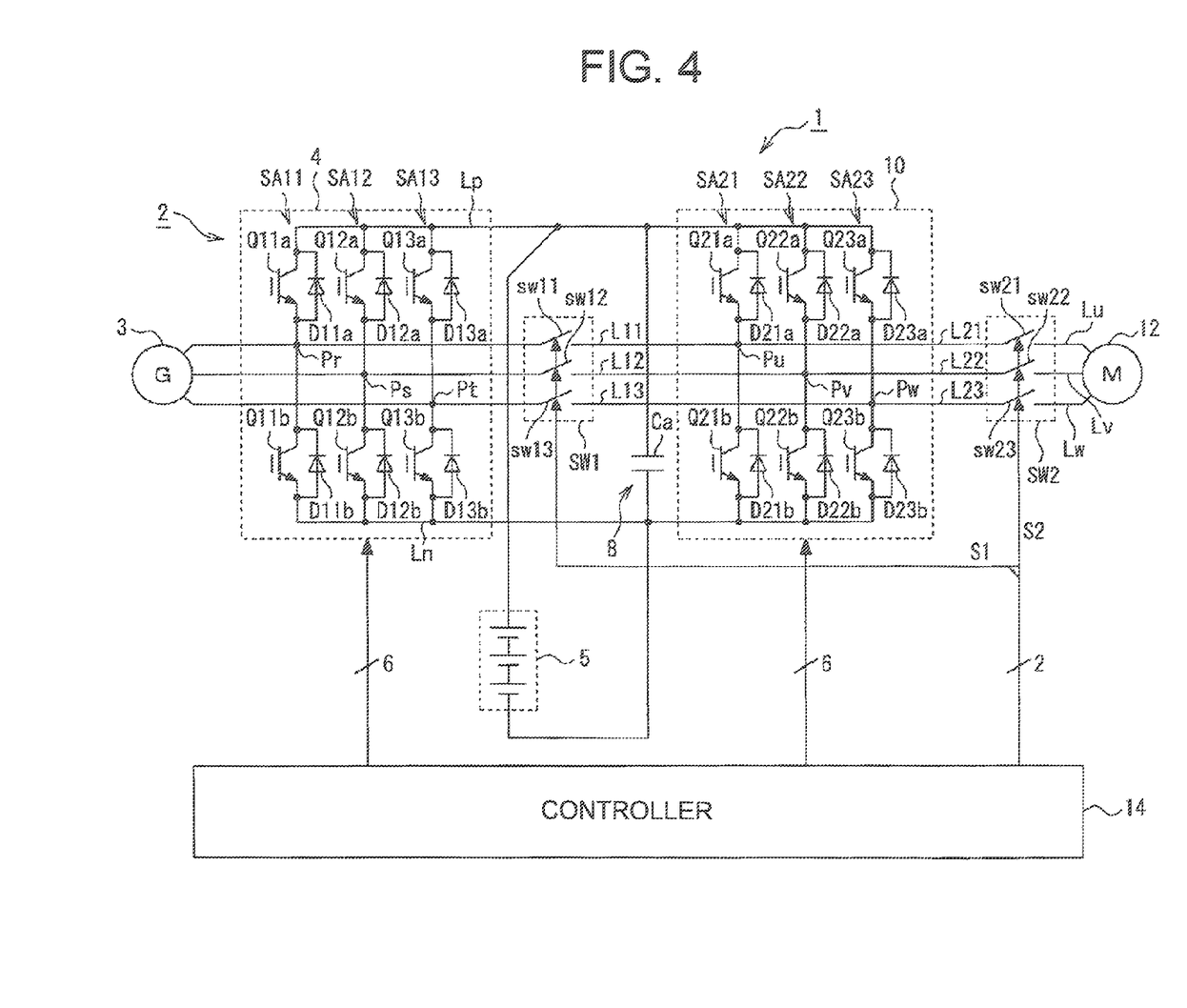
FIG. 4 is a block diagram of power conversion equipment according to a second embodiment of the invention.

In the power conversion equipment according to the second embodiment, second switch SW2 and second short-circuit paths L21, L22, and L23 in the structure shown in FIG. 1 are inserted, not between three-phase AC generator 3 and AC input points Pr, Ps, and Pt of AC-DC converter circuit 4, but between AC output points Pu, Pv, and Pw of DC-AC converter circuit 10 and windings Lu, Lv, and Lw of three-phase AC motor 12 in FIG. 4. In other aspects, the power conversion equipment according to the second embodiment has the same structure as the structure of the power conversion equipment according to the first embodiment. The same reference numerals and symbols as used in FIG. 1 are used in FIG. 4 to designate the same constituent elements, and their duplicated descriptions are omitted for the sake of simplicity.

Figure 5:
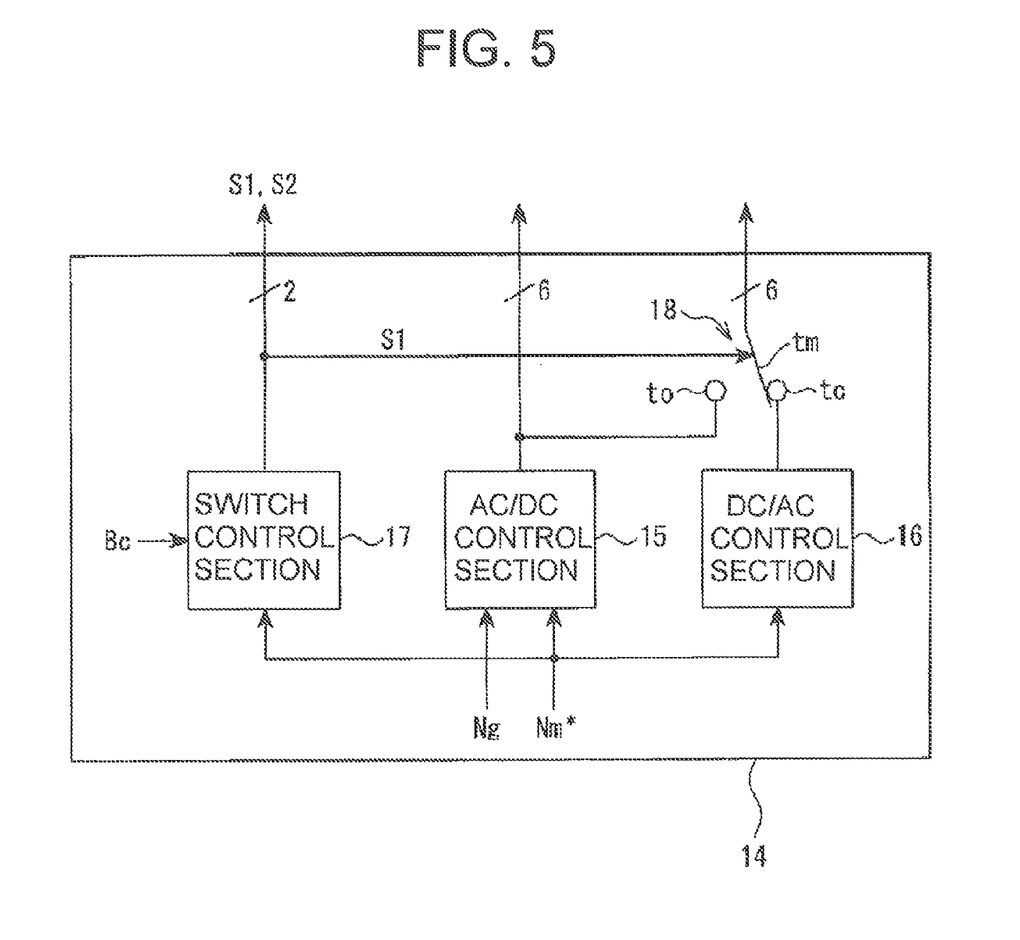
FIG. 5 is a block diagram showing the structure of the controller in FIG. 4.

In controller 14 shown in FIG. 5, selecting switch section 18 is disposed, not on the output side of AC-DC control section 15, but on the output side of DC-AC control section 16. Further, normally-closed contact tc is connected to DC-AC control section 16, normally-open contact to to AC-DC control section 15, and moveable contact tm to the gates of the switching devices in DC-AC converter circuit 10. Moreover, the command value of the charging current (hereinafter referred to as the "charging current command value") Bc is fed to switch control section 17.

In the state in which the charging current command value Bc is lower than a predetermined set current value Bcs, the switching signal S1 is set in the OFF-state and the switching signal S2 in the ON-state. In the state in which the charging current command value Bc is equal to or higher than the predetermined set current value Bcs, the switching signal S1 is set in the ON-state and the switching signal S2 in the OFF-state.

According to the second embodiment, switch control section 17 brings the switching signal S1 into the OFF-state and the switching signal S2 into the ON-state in the usual state in which three-phase AC motor 12 is rotated. Therefore, first switch SW1 is brought into the open-state and second switch SW2 into the closed-state. Therefore, at least either the DC electric power from first DC power supply 2 or the DC electric power from second DC power supply 5 is converted to three-phase AC electric power by DC-AC converter circuit 10 to rotate three-phase AC motor 12.

Considering, on the other hand, the situation in which the voltage charged to second DC power supply 5 becomes lower, the charging current command value Bc is fed to switch control section 17 and the charging current command value Bc is lower than the predetermined set current value Bcs in the state in which the DC voltage fed from first power supply 2 is higher than the voltage charged to second DC power supply 5. In this situation, the switching signal S1 of switch control section 17 keeps the OFF-state, the switching signal S2 thereof keeps the ON-state, and the three-phase AC electric power generated by three-phase AC generator 3 is converted to DC electric power by AC-DC converter circuit 4 to charge second DC power supply 5.

In the regeneration state, in which three-phase AC motor 12 works as a generator, DC-AC converter circuit 10 is controlled to be an AC-DC converter circuit by DC-AC control section 16. In the regeneration state, the three-phase AC electric power generated in three-phase AC motor 12 is converted to DC electric power by DC-AC converter circuit 10 and the converted DC electric power charges second DC power supply 5.

However, when the voltage charged to second DC power supply 5 is greatly lowered, the charging current command value Bc fed to switch control section 17 becomes equal to or higher than the predetermined set current value Bcs. Therefore, switch control section 17 reverses the switching signal S1 into the ON-state and the switching signal S2 into the OFF-state.

Therefore, first switch SW1 is brought into the closed-state thereof and second switch SW2 into the open-state thereof. Input points Pr, Ps, and Pt of AC-DC converter circuit 4 and AC output points Pu, Pv, and Pw of DC-AC converter circuit 10 are connected to each other via first switch SW1 and short-circuit paths L11, L12, and L13. On the other hand, short-circuit paths L21, L22, and L23 between output points Pu, Pv, and Pw of DC-AC converter circuit 10 and three-phase AC motor 12 are interrupted.

At the same time, moveable contact tm of selecting switch section 18 is changed over to the side of normally-open contact to and PWM signals are fed from AC-DC control section 15 to the gates of the switching devices in DC-AC converter circuit 10.

Therefore, the three-phase AC electric power generated in three-phase AC generator 3 is converted to DC electric power in AC-DC converter circuit 4 and also in DC-AC converter circuit 10. As a result, the value of the charging current that charges second DC-power supply 5 increases and second DC-power supply 5 is charged at a high speed in a short time.

As the high-speed charging of second DC-power supply 5 is completed, the charging current command value Bc fed to switch control section 17 becomes lower than the predetermined set current value Bcs. As the charging current command value Bc becomes lower than the predetermined set current value Bcs, the switching signal S1 is reversed to the OFF-state, the switching signal S2 is reversed to the ON-state, and three-phase AC motor 12 returns to the rotated state.

According to the second embodiment, short-circuit paths L21, L22, and L23 between AC output points Pu, Pv, and Pw of DC-AC converter circuit 10 and windings Lu, Lv, and Lw of three-phase AC motor 12 are interrupted in the case in which the voltage charged to second DC power supply 5 becomes greatly lowered and it becomes necessary to conduct high-speed charging. At the same time, DC-AC converter circuit 10 is changed over to an AC-DC converter circuit. By these operations, the three-phase AC electric power generated in three-phase AC generator 3 is converted to DC electric power by two AC-DC converter circuits, the value of the charging current for charging second DC power supply 5 is increased, and second DC power supply 5 is charged at a high speed.

Next, power conversion equipment according to a third embodiment of the invention will be described below with reference to FIGS. 6 and 7.

The power conversion equipment according to the third embodiment facilitates rotating three-phase AC motor 12 at a high speed and charging second DC power supply 5 at a high speed.

Figure 6:
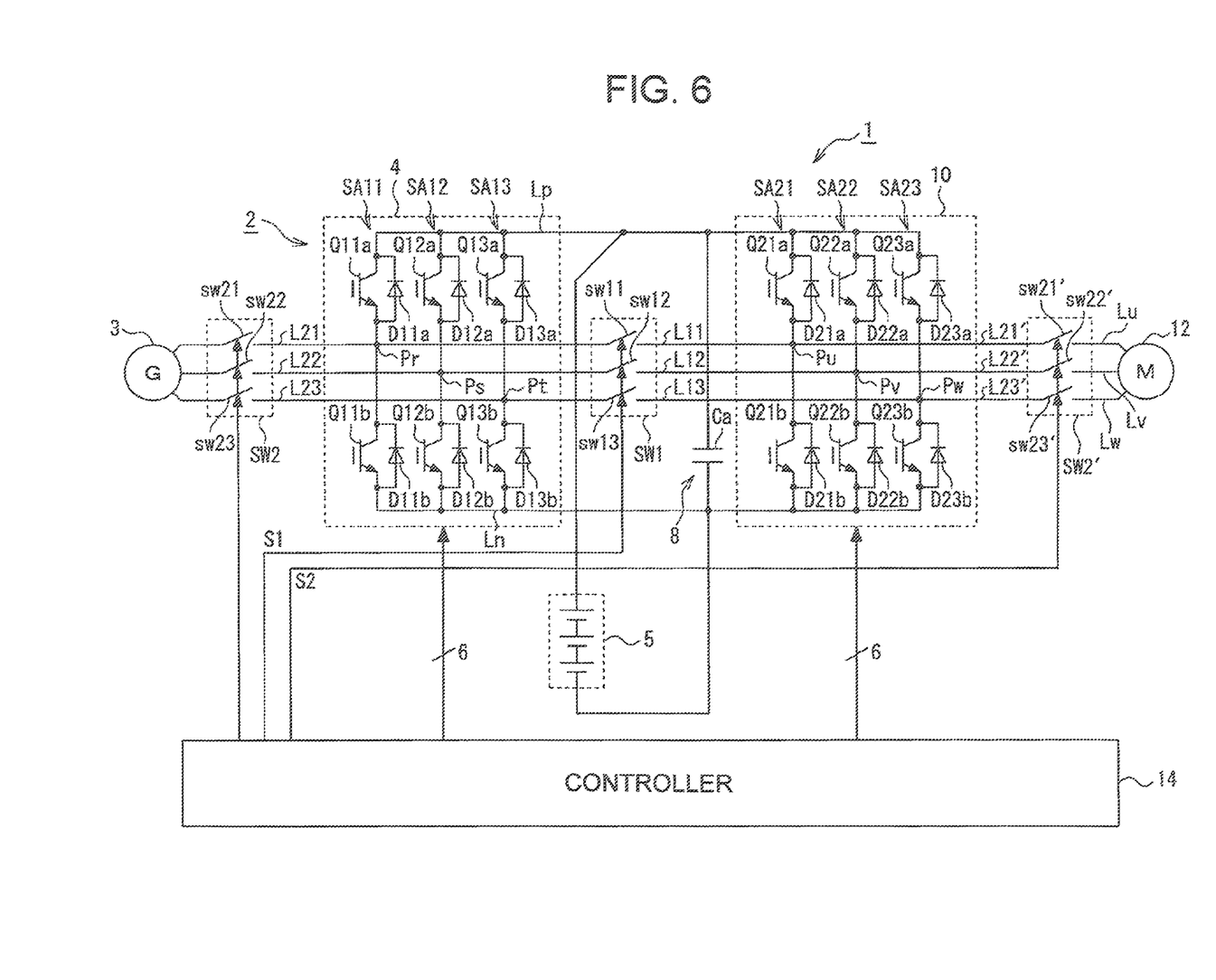
FIG. 6 is a block diagram of power conversion equipment according to a third embodiment of the invention.

As shown in FIG. 6, the power conversion equipment according to the third embodiment includes the specific structures of the power conversion equipment according to the first and second embodiments. In contrast to the structure according to the first embodiment shown in FIG. 1, AC output points Pu, Pv, and Pw of DC-AC converter circuit 10 are connected to windings Lu, Lv, and Lw of three-phase AC motor 12 with short-circuit paths L21', L22', and L23', into which second switch SW2' is inserted in FIG. 6. Since the other structures are the same as the structures according to the first embodiment, the same reference numerals and symbols as used in FIG. 1 are used to designate the same constituent elements in FIG. 6 and their duplicated description are omitted for the sake of simplicity.

Figure 7:
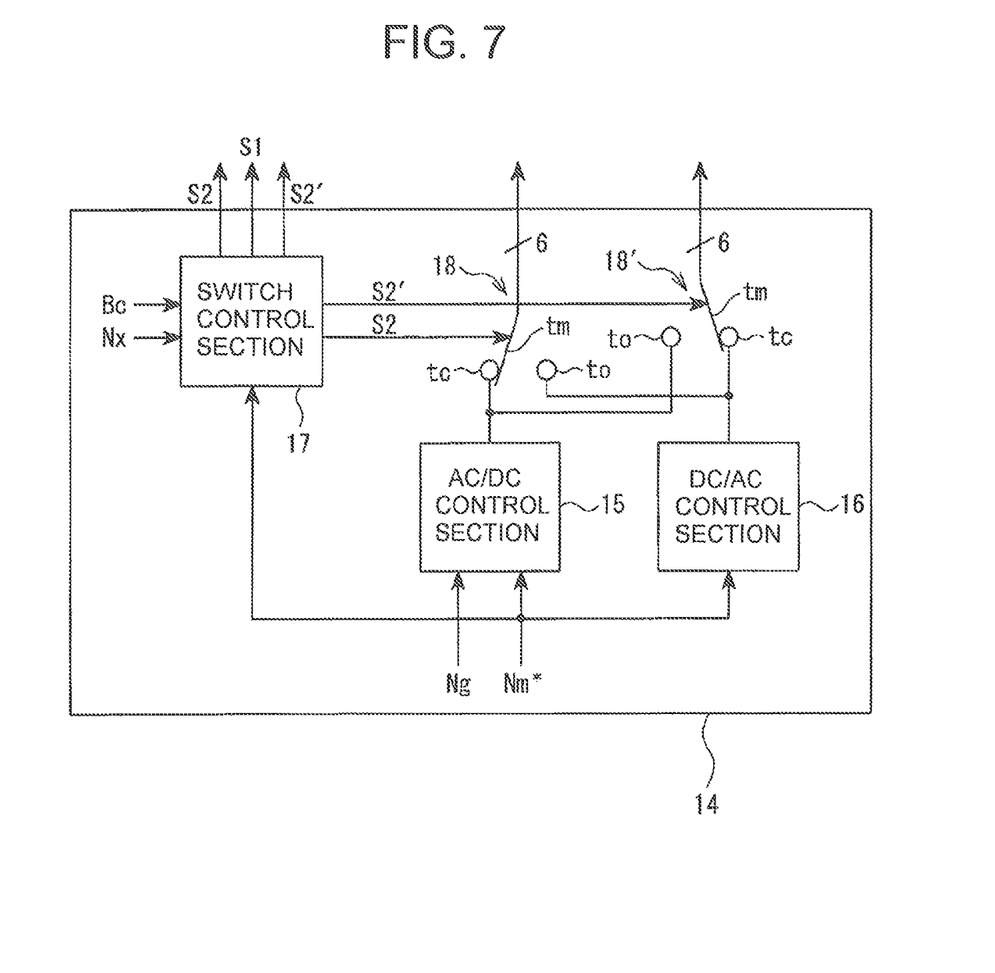
FIG. 7 is a block diagram showing the structure of the controller in FIG. 6.

Controller 14 further includes selecting switch section 18' disposed in DC-AC control section 16 in the controller structure shown in FIG. 7. Normally-closed contact tc of selecting switch section 18' is connected to DC-AC control section 16, normally-open contact to thereof to AC-DC control section 16, and moveable contact tm thereof to the gates of the switching devices in DC-AC converter circuit 10.

The set revolution number Nx and the charging current command value Bc are fed to switch control section 17. In the usual driving mode, the motor speed based on the speed command value (or the frequency command value) Nm* is smaller than the set revolution number Nx, and the charging current command value Bc is lower than the predetermined set current value Bcs. In the usual driving mode, the switching signal S1 is controlled to be in the OFF-state and the switching signals S2 and S2' to be in the ON-state.

In the high-speed motor driving mode, the motor speed based on the speed command value (or the frequency command value) Nm* is equal to or larger than the set revolution number Nx, and the charging current command value Bc is lower than the predetermined set current value Bcs. In the high-speed motor driving mode, the switching signal S1 is controlled to be in the ON-state, the switching signal S2 to be in the OFF-state, and the switching signal S2' to be in the ON-state.

In the high-speed DC-power-supply charging mode (hereinafter referred to as the "high-speed charging mode"), the motor speed based on the speed command value (or the frequency command value) Nm* is smaller than the set revolution number Nx, and the charging current command value Bc is equal to or higher than the predetermined set current value Bcs. In the high-speed charging mode, the switching signal S1 is controlled to be in the ON-state and the switching signal S2 to be in the ON-state and switching signal S2' to be in the OFF-state.

In selecting switch section 18, moveable contact tm is in contact with normally-closed contact tc in the ON-state of the switching signal S2 and in contact with normally-open contact to in the OFF-state of the switching signal S2. In selecting switch section 18', moveable contact tm is in contact with normally-closed contact tc in the ON-state of the switching signal S2' and in contact with normally-open contact to in the OFF-state of the switching signal S2'.

According to the third embodiment, switch control section 17 controls the switching signal S1 to be in the OFF-state and the switching signals S2 and S2' to be in the ON-state in the usual driving mode. In the usual driving mode, the motor speed based on the speed command value (or the frequency command value) Nm* is smaller than the set revolution number Nx, the charging current command value Bc is lower than the predetermined set current value Bcs, and three-phase AC motor 12 is rotated in the usual manner.

First switch SW1 is brought into the open-state and second switches SW2 and SW2' into the closed-state. Therefore, the three-phase AC electric power generated in three-phase AC generator 3 is converted to DC electric power by AC-DC converter circuit 4 and the converted DC electric power and/or the DC electric power fed from second DC power supply 5 is converted to three-phase AC electric power by DC-AC converter circuit 10. The converted three-phase AC electric power is fed to three-phase AC motor 12 to rotate three-phase AC motor 12 in the usual manner.

As the operation shifts from the usual driving mode to the high-speed motor driving mode, switch control section 17 controls the switching signal S1 to be in the ON-state, the switching signal S2 to be in the OFF-state and the switching signal S2' to be in the ON-state. In the high-speed motor driving mode, the motor speed based on the speed command value (or the frequency command value) Nm* and fed to switch control section 17 is equal to or larger than the set revolution number Nx and three-phase AC motor 12 is rotated at a high speed.

Therefore, first switch SW1 is brought into the closed-state, second switch SW2 is brought into the open-state, second switch SW2' is brought into the closed-state, and AC-DC converter circuit 4 is made to work as a DC-AC converter circuit. Therefore, the DC electric power from second DC power supply 5 is converted to AC electric power components by DC-AC converter circuit 10 and AC-DC converter circuit 4. The converted AC electric power components are added to each other at AC output points Pu, Pv, and Pw of DC-AC converter circuit 10 and fed to three-phase AC motor 12. Therefore, three-phase AC motor 12 is rotated at a high-speed.

As the voltage charged to second DC power supply 5 is greatly lowered, the high-speed charging mode is caused. In the high-speed charging mode, the motor speed based on the speed command value (or the frequency command value) Nm* is smaller than the set revolution number Nx and the charging current command value Bc is equal to or higher than the predetermined set current value Bcs. In the high-speed charging mode, switch control section 17 controls the switching signal S1 to be in the ON-state, the switching signal S2 to be in the ON-state, and the switching signal S2' to be in the OFF-state.

Due to the switch control, first and second switches SW1 and SW2 are brought into the conductive state, second switch SW2' is brought into the interrupted state, and DC-AC converter circuit 10 is made to work as an AC-DC converter circuit. Therefore, the three-phase AC electric power generated by three-phase AC generator 3 is converted to DC electric power by AC-DC converter circuit 4 and DC-AC converter circuit 10. The converted DC electric power charges second DC power supply 5 at a high speed.

The conductive states of switches SW1, SW2 and SW2' in the usual driving mode, high-speed motor driving mode and high-speed charging mode are listed in the following Table 1.

TABLE 1

| Driving modes | Generator side | Intermediate section | Motor side |
|---|---|---|---|
| Usual driving | Conductive (Closed) | Interrupted (Open) | Conductive (Closed) |
| High-speed motor driving | Interrupted | Conductive | Conductive |
| High-speed battery charging | Conductive | Conductive | Interrupted |

According to the third embodiment, it is possible for power conversion equipment 1 to conduct three modes of operations selectively: the usual driving mode, the high-speed motor driving mode, and the high-speed charging mode. Moreover, the three modes of operations are obtained with a simple structure that includes short-circuit paths L11, L12, and L13, into which first switch SW1 is inserted, short-circuit paths L21, L22, and L23, into which second switch SW2 is inserted, and short-circuit paths L21', L22', and L23', into which second switch SW2' is inserted. Therefore, power conversion equipment 1 capable of selecting an appropriate operation mode out of the three operation modes is configured with low manufacturing costs.

Figure 8:
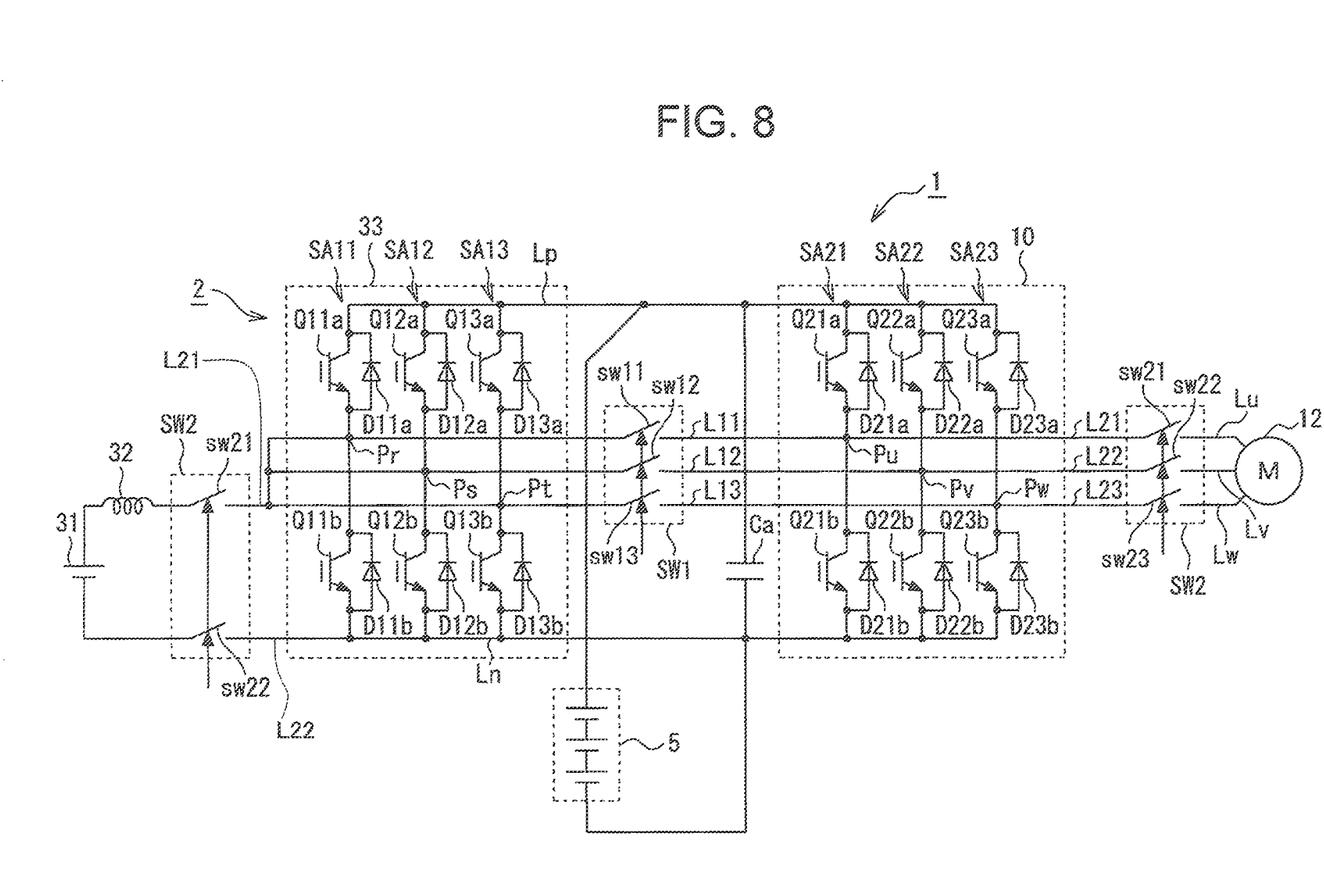
FIG. 8 is a block diagram of power conversion equipment according to a fourth embodiment of the invention.

Next, power conversion equipment according to a fourth embodiment of the invention will be described below with reference to FIG. 8.

The power conversion equipment according to the fourth embodiment is different from the power conversion equipment shown in FIG. 6 in the following points. In FIG. 8, first DC power supply 2 in the structure according to the third embodiment is replaced by a DC power supply configured as described below. First DC power supply 2 in FIG. 8 includes battery 31 and a boost circuit including boost reactor 32 connected in series to battery 31 and DC-DC converter circuit 33. DC-DC converter circuit 33 has the structure as the structure of AC-DC converter circuit 4. The positive electrode of battery 31 is connected to an end of boost reactor 32. The other end of boost reactor 32 is connected to input points Pr, Ps, and Pt of DC-DC converter circuit 33 via short-circuit path L21, into which switch sw21 of second switch SW2 is inserted. The negative electrode of battery 31 is connected to the negative side of DC-DC converter circuit 33 via short-circuit path L22, into which switch sw22 of second switch SW2 is inserted. The other structures are the same as those of the power conversion equipment shown in FIG. 6. Therefore, the same reference numerals and symbols as used in FIG. 6 are used in FIG. 8 to designate the same constituent elements and their duplicated descriptions are omitted for the sake of simplicity.

According to the fourth embodiment, first DC power supply 2 includes battery 31 and a boost circuit including boost reactor 32 and DC-DC converter circuit 33. Therefore, first switch SW1 is brought into the interrupted (open) state and second switches SW2 and SW2' are brought into the conductive (closed) state in the usual driving mode. In the usual driving mode, three-phase AC motor 12 is rotated in the usual manner by feeding the boosted DC electric power obtained by boosting the voltage charged to battery 31 to DC-AC converter circuit 10.

In the high-speed motor driving mode, first switch SW1 and second switch SW2' are brought into the conductive (closed) state and second switch SW2 is brought into the interrupted (open) state. Due to the switch control described above, three-phase AC motor 12 is rotated at a high speed by converting the DC electric power fed from second DC power supply 5 to three-phase AC electric power components by DC-DC converter circuit 33 and DC-AC converter circuit 10.

In the high-speed charging mode, first switch SW1 and second switch SW2 are brought into the conductive (closed) state, second switch SW2' is brought into the interrupted (open) state, and a boost circuit is configured by boost reactor 32 and DC-AC converter circuit 10. Since second DC power supply 5 is charged by two boost circuits, second DC power supply 5 is charged at a high speed.

The power conversion equipment according to the fourth embodiment exhibits the same functions and effects as the functions and effects which the power conversion equipment according to the third embodiment exhibits.

Although the power conversion equipment according to the fourth embodiment has been described so far in connection with first DC power supply 2 including battery 31, any arbitrary DC power supply may be used in substitution for battery 31. For example, a fuel cell and a solar cell may be used in substitution for battery 31 with no problem.

Although the power conversion equipment according to the first through fourth embodiments has been described in connection with a battery used for second DC power supply 5, a capacitor may be used in substitution for the battery with no problem.

Figure 9:
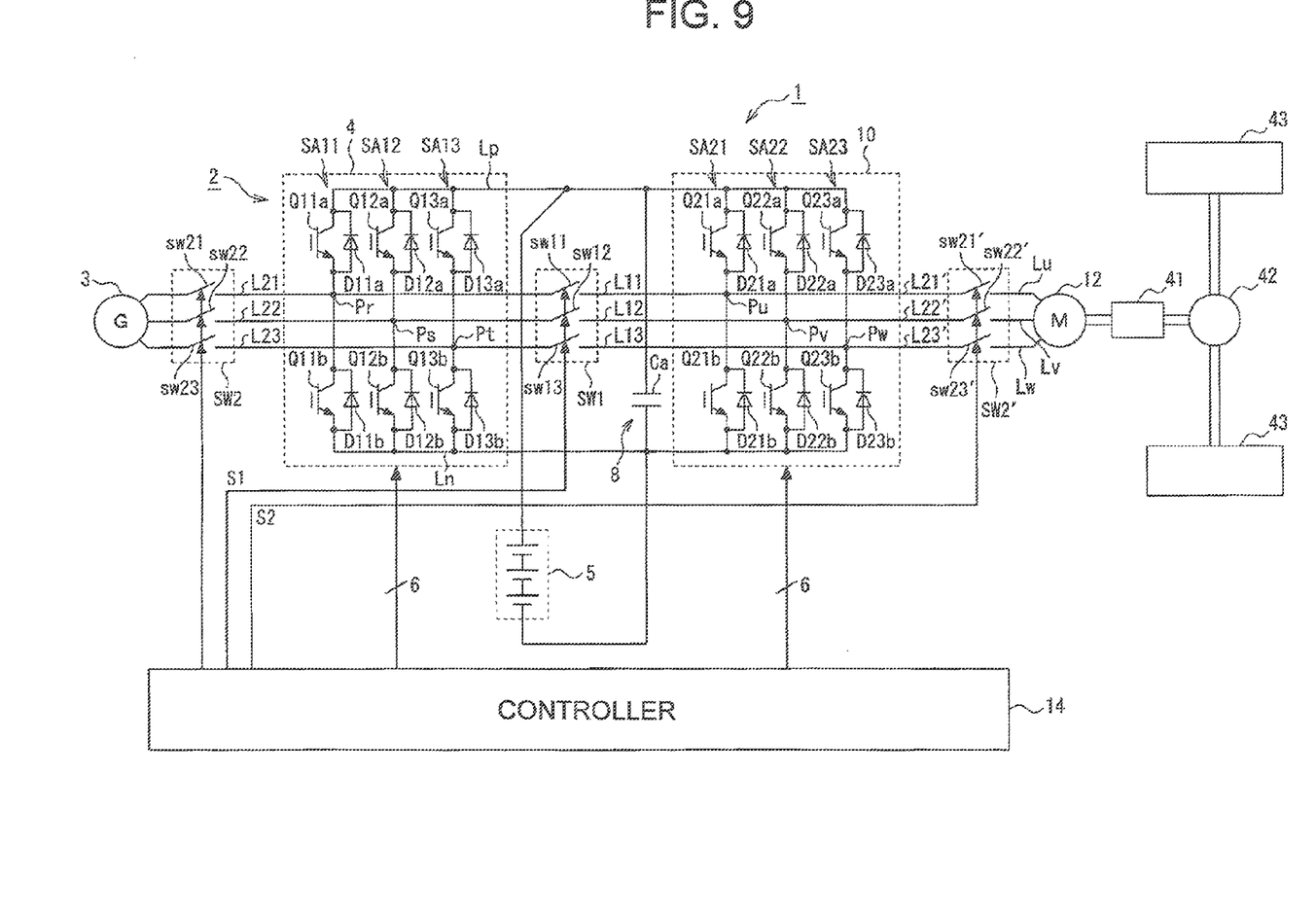
FIG. 9 is a block diagram describing the application of the power conversion equipment according to the invention to a hybrid vehicle.

Although the power conversion equipment according to the first through third embodiments have been described in connection with a motor driving apparatus that rotates three-phase motor 12 by power conversion equipment 1, changes and modifications are possible. For example, three-phase motor 12 is linked, for example, to differential gear 42 via reduction gear 41, if necessary, and driving wheels 43 linked to differential gear 42 are rotated as shown in FIG. 9. The structure shown in FIG. 9 is applicable to hybrid vehicles.

Although the power conversion equipment according to the fourth embodiment has been described in connection with a motor driving apparatus that rotates three-phase motor 12 by power conversion equipment 1, changes and modifications are possible. For example, three-phase motor 12 is linked, for example, to a differential gear via reduction gear 41, if necessary, and the driving wheels linked to the differential gear are rotated as shown in FIG. 9. The structure described above is applicable to hybrid vehicles and electric vehicles.

Although the power conversion equipment according to the first through third embodiments have been described in connection with three-phase AC generator 3 and three-phase AC motor 12, the power conversion equipment according to the first through third embodiments are applicable to a four- or more-phases AC generator and a four- or more-phases AC motor. In this case, the switching arms in AC-DC converter circuit 4 and the switching arms in DC-AC converter circuit 10 may be increased corresponding to the number of phases with no problem.

Although the power conversion equipment according to the first through fourth embodiments have been described in connection with IGBTs for the switching devises, other switching devices may be employed considering the electric power consumption. Alternatively, a power MOSFET, a gate-turnoff thyristor (GTO), and an electrostatic-induction transistor (SIT) may be employed.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. Power conversion equipment comprising:
   a first DC power supply, the first DC power supply comprising
      an electric power feeding section,
      an electric power input section, for receiving electric power fed from the electric power feeding section, and
      a DC electric power converting section for converting the electric power fed to the electric power input section to DC electric power;
   a second DC power supply comprising a capacitor connected in parallel to the first DC power supply;
   a smoothing circuit section for smoothing the DC electric power fed from the first DC power supply and DC electric power fed from the second DC power supply;
   an electric power converting section connected to the smoothing circuit section, the electric power converting section for converting the DC electric power to multiphase AC electric power and feeding the converted multiphase AC electric power to a multiphase AC motor;
   a first short-circuit section comprising a first switch inserted therein, the first switch being disposed between a multiphase AC output point of the electric power input section in the first DC power supply and a multiphase AC output point of the electric power converting section;
   a second short-circuit section comprising a second switch inserted therein, the second switch being disposed between at least one of the electric power feeding section and the electric power input section in the first DC power supply or the multiphase AC output point of the electric power converting section and the multiphase AC motor; and
   a switch control section, the switch control section for controlling the first switch and the second switch for preventing the first switch and the second switch from being closed simultaneously.

2. The power conversion equipment according to claim 1, wherein the electric power feeding section in the first DC power supply comprises a multiphase AC generator and the DC electric power converting section in the first DC power supply comprises a multiphase AC-DC converter circuit.

3. The power conversion equipment according to claim 2, wherein the multiphase AC generator is driven by an internal combustion engine.

4. The power conversion equipment according to claim 1, wherein the electric power feeding section in the first DC power supply comprises a battery and the DC electric power converting section in the first DC power supply comprises a boost circuit.

5. The power conversion equipment according to claim 1, wherein the DC electric power converting section in the first DC power supply comprises a switching arm comprising a switching device and a diode connected in opposite parallel to each other.

6. The power conversion equipment according to claim 1, wherein the electric power converting section comprises a switching arm comprising a switching device and a diode connected in opposite parallel to each other.

7. Power conversion equipment comprising:
   at least one DC power supply including an electric power feeding section and an electric power input section;
   an electric power converting section connected to the at least one DC power supply, for converting DC electric power output by the at least one DC power supply to multiphase AC electric power;
   a first switch disposed between a multiphase AC output point of the at least one DC power supply and a multiphase AC output point of the electric power converting section;

a second switch disposed between the electric power feeding section and the electric power input section in the at least one DC power supply; and a switch control section for controlling the first switch and the second switch, to prevent the first switch and the second switch from being closed simultaneously.

8. The power conversion equipment of claim 7, further comprising:

a smoothing circuit section for smoothing DC electric power output from the at least one DC power supply.

9. The power conversion equipment of claim 8, further comprising:

another DC power supply connected to the smoothing circuit section and the at least one DC power supply.

10. Power conversion equipment comprising:

at least one DC power supply including an electric power feeding section and an electric power input section;

an electric power converting section connected to the at least one DC power supply, for converting DC electric power output by the at least one DC power supply to multiphase AC electric power;

a first switch disposed between a multiphase AC output point of the at least one DC power supply and a multiphase AC output point of the electric power converting section;

a second switch disposed between the multiphase AC output point of the electric power converting section and a multiphase AC motor; and a switch control section for controlling the first switch and the second switch, to prevent the first switch and the second switch from being closed simultaneously.

11. The power conversion equipment of claim 10, further comprising:

a smoothing circuit section for smoothing DC electric power output from the at least one DC power supply.

12. The power conversion equipment of claim 11, further comprising:

another DC power supply connected to the smoothing circuit section and the at least one DC power supply.

* * * * *